United States Patent
Shatten et al.

(12) 
(10) Patent No.: US 6,668,562 B1
(45) Date of Patent: Dec. 30, 2003

(54) SYSTEM AND METHOD FOR CRYOGENIC COOLING USING LIQUEFIED NATURAL GAS

(76) Inventors: Robert A. Shatten, 41 Margaret St., Arlington, MA (US) 02474; John Carrier, 23 Wellington St., Apt. #1, Arlington, MA (US) 02476; Johnny Dean Jackson, 7 Misty Vale Rd., Sandy Hook, CT (US) 06482

( * ) Notice: Subject to any disclaimer, the term of this patent is extended or adjusted under 35 U.S.C. 154(b) by 0 days.

(21) Appl. No.: 09/964,287

(22) Filed: Sep. 26, 2001

Related U.S. Application Data
(60) Provisional application No. 60/235,355, filed on Sep. 26, 2000.

(51) Int. Cl.$^7$ .................................................. F25B 1/00
(52) U.S. Cl. ......................................................... 62/50.2
(58) Field of Search ........................... 62/50.2, 505, 320, 62/63; 241/23

(56) References Cited

U.S. PATENT DOCUMENTS

| | | | |
|---|---|---|---|
| 3,319,434 A | | 5/1967 | Matesanz |
| 3,535,210 A | * | 10/1970 | Linde et al. .................. 62/50.2 |
| 4,496,073 A | | 1/1985 | Silver et al. ................. 220/445 |
| 4,578,962 A | * | 4/1986 | Dustmann .................... 62/505 |
| 4,590,770 A | | 5/1986 | Howard .......................... 62/52 |
| 5,137,558 A | | 8/1992 | Agrawai ......................... 62/24 |
| 5,394,686 A | | 3/1995 | Child et al. ................. 60/39.02 |
| 5,581,135 A | | 12/1996 | Ito et al. ........................ 310/52 |
| 5,597,123 A | | 1/1997 | Steigman et al. ............. 241/23 |
| 5,634,599 A | | 6/1997 | Khais et al. .................. 241/23 |
| 5,735,471 A | | 4/1998 | Muro ........................... 241/23 |
| 5,758,831 A | | 6/1998 | Collins et al. ................. 241/1 |
| 5,775,603 A | | 7/1998 | Kohler et al. ................. 241/23 |
| 5,789,837 A | | 8/1998 | Shin et al. ................... 310/90.5 |
| 5,987,896 A | | 11/1999 | James et al. .................. 62/48.3 |
| 6,041,620 A | | 3/2000 | Olszewski et al. ............. 62/612 |

FOREIGN PATENT DOCUMENTS

| | | | |
|---|---|---|---|
| JP | 1988000220376 | 3/1990 | ............ F28D/15/02 |
| JP | 1990000168642 | 2/1992 | ............ F28F/19/06 |
| JP | 1990000190586 | 3/1992 | ............ F25B/15/00 |
| JP | 1990000250324 | 5/1992 | .............. F25J/1/00 |
| JP | 1992000319231 | 5/1994 | ............ F28C/1/14 |
| JP | 05033939 | 8/1994 | ........... F02C/7/143 |
| JP | 06229258 A | 8/1994 | ........... C09K/5/00 |
| JP | 06326921 | 7/1996 | ........... C10L/3/06 |
| JP | 1995000227855 | 3/1997 | ............ F17C/7/04 |
| JP | 1998000035395 | 8/1999 | ............ F28D/7/06 |

OTHER PUBLICATIONS

Kohler, et al. Enhancements in cryogenic fine grinding, Rubber & Plastics News, p. 12–13, Jun. 1, 1998.

Leading the way into the future, Recovery Technologies Inc. pp. 1–3.

* cited by examiner

*Primary Examiner*—Henry Bennett
*Assistant Examiner*—Malik N. Drake
(74) *Attorney, Agent, or Firm*—Bromberg & Sunstein LLP

(57) ABSTRACT

A system and method for cooling a material with liquefied natural gas where liquefied natural gas and the material to be cryogenically cooled are brought into direct or indirect contact and cooled material and a combination of liquefied natural gas and natural gas are removed. Cooling may also employ an intermediate cooling medium such as a refrigerant or nitrogen. In the case of converting rubber in tires to rubber crumb, cooling of the products of a hammer mill and a fine grind mill by nitrogen subsequent to the cooling of nitrogen by a refrigerant and the refrigerant by liquefied natural gas converts shredded tires into recyclable rubber crumb.

12 Claims, 3 Drawing Sheets

SYSTEM AND METHOD FOR CRYOGENIC COOLING USING LIQUEFIED NATURAL GAS

CROSS REFERENCE TO RELATED APPLICATIONS

This application claims priority from provisional application Serial Number 60/235,355, filed Sep. 26, 2000, entitled "SYSTEM AND METHOD FOR CRYOGENIC COOLING USING LIQUID NATURAL GAS" which is incorporated herein, in its entirety, by reference.

FIELD OF THE INVENTION

The invention generally relates to the generation of cryogenic cooling of materials by liquefied natural gas (LNG) for purposes of recycling and, more particularly, to the application of cryogenic cooling to the cryogenic grinding of scrap tires.

BACKGROUND OF THE INVENTION

Most of the 270 million scrap tires produced in the U.S. are disposed of in landfills, converted to fuel, or recycled by shredding. Of these methods, cryogenic grinding and ambient wet attrition provide the highest resale value for the tire's components and are the environmentally superior solutions by allowing for the creation of new products from these materials. These methods currently are used on less than 1% of the scrapped tires.

The traditional method of using liquid nitrogen to cool the tires to below −200° F. adds approximately $0.40–0.60 in processing costs per tire. Recently, the use of air cooled to −202° F. by means of an on-site cryogenic air cooler has been claimed to have reduced refrigeration costs to $0.20 to $0.60 per tire. The wet attrition grinding method avoids the processing costs associated with the consumption of liquid nitrogen or refrigerated air, but is energy intensive and requires much specialized equipment that is expensive to buy and to maintain.

SUMMARY OF THE INVENTION

The invention provides, in a preferred embodiment, a method for embrittling a material, including rubber. The material transfers heat to liquefied natural gas, vaporizing at least a portion of the liquefied natural gas and producing subsequently recovered natural gas in the process. Processes for transferring heat from the material to the liquefied natural gas include to the liquefied natural gas by direct contact, to a refrigerant that subsequently transfers heat to liquefied natural gas, and to a second refrigerant such as nitrogen that transfers heat to a first refrigerant that next transfers heat to liquefied natural gas.

A further embodiment describes a method for converting rubber in tires into rubber crumb and includes shredding tires, transferring heat from the shredded tires to liquefied natural gas, crushing the cooled, shredded tires, and separating the crushed, shredded tires into components that include rubber crumb. The method can include further cooling the rubber crumb, grinding the cooled rubber crumb into a ground product, and sorting the ground product into constituents such as fiber, steel, and rubber crumb. Crushing may be accomplished in a hammer mill and grinding in a grinding mill. Processes for transferring heat from the shredded tires and from the rubber crumb to the liquefied natural gas include to the liquefied natural gas by direct contact and to a second refrigerant such as nitrogen that transfers heat to a first refrigerant that next transfers heat to liquefied natural gas.

In yet another embodiment, an electrical conductor is cooled to a superconducting transition temperature by providing liquefied natural gas, transferring heat from the electrical conductor to the liquefied natural gas, vaporizing at least a portion of the liquefied natural gas in the process, and recovering the natural gas. Processes for transferring heat from the electrical conductor to the liquefied natural gas include to the liquefied natural gas by direct contact, to a refrigerant such as nitrogen that subsequently transfers heat to liquefied natural gas, and to a second refrigerant such as nitrogen that transfers heat to a first refrigerant that next transfers heat to liquefied natural gas.

In still yet another embodiment, a system is provided for the grinding of an elastomeric material where there is a supply of liquefied natural gas, a heat exchanger for transferring heat from the material to the liquefied natural gas so as to create cryogenically glassified material, a mill for grinding the cryogenically glassified material into ground material, and a transporter for removing the ground material. The heat exchanger can comprise a container to which liquefied natural gas is added and from which natural gas is removed and to which material is added and from which cooled material is removed. In addition, the heat exchanger can comprise a pipe into which the material enters at one end and from which cooled material leaves at the other end and a jacket surrounding the pipe having an input into which liquefied natural gas enters and an output from which a combination of liquefied natural gas and natural gas is extracted.

BRIEF DESCRIPTION OF THE DRAWINGS

The invention will be more readily understood by reference to the following description, with the accompanying drawings, in which.

DETAILED DESCRIPTION OF SPECIFIC EMBODIMENTS

Figure 1:
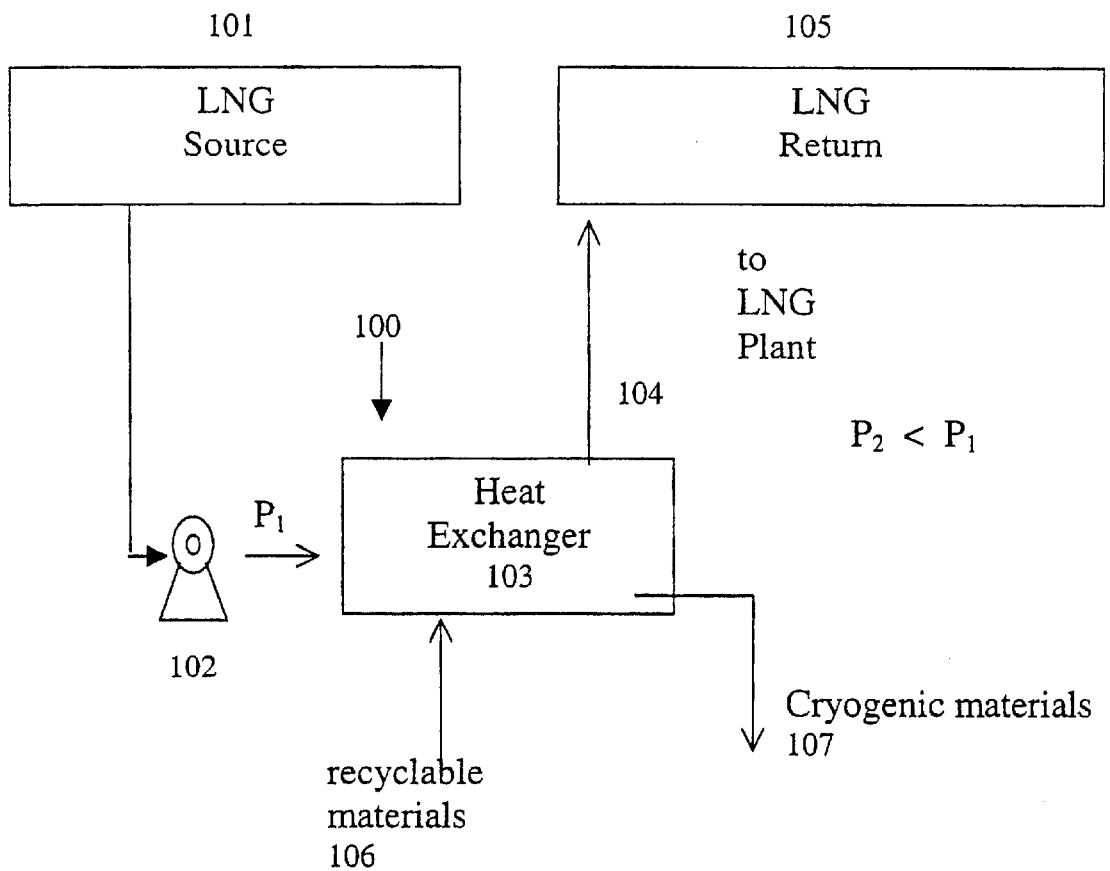
FIG. 1 is a process overview for using LNG to provide cooling for recyclable materials, in accordance with preferred embodiments of the invention.

The present invention may further advantageously reduce refrigeration costs by exploiting the cryogenic refrigeration capacity of liquefied natural gas (LNG) stored at LNG receiving/distribution terminals. By permitting exploitation of the lower temperatures associated with LNG, preferred embodiments of the present invention may permit reduction of the particle size of the rubber crumb, the preferred powder end product of tire recycling.

Cryogenic tire recycling may advantageously complement the distribution of LNG in the following sense. LNG is delivered to the LNG terminal at −258° F., but must be vaporized and heated to ambient temperature prior to distribution. A typical LNG terminal uses natural gas as a fuel to vaporize the LNG and both loses the benefit of the refrigeration capacity in the LNG and on average consumes approximately 2% of the total received liquefied natural gas in order to vaporize it.

In accordance with certain embodiments of the invention, a slipstream or portion of liquefied natural gas from an LNG facility vaporizes in the process of cryogenically cooling scrap tires. The vaporized natural gas remains in the facility's existing natural gas distribution infrastructure. This method is analogous to traditional cogeneration utilized at electric power stations where a portion of the steam energy remaining after expansion is used for heating instead of being wasted during condensation. In this case, the cooling capability of the LNG is harnessed instead of being wasted when the LNG is vaporized prior to distribution to customers.

Because LNG permits the inexpensive cooling of tires relative to current cryogenic techniques, embodiments of the invention may produce a product more efficiently and cost effectively. In addition, the more refrigeration capacity utilized by the method, the more efficient both the LNG facility and the cryogenic grinding facility may become. This can enable finer grinding of materials significantly more cost effectively since finer grinding requires the most refrigeration.

Conventional grinding takes place by cutting, attrition, impact actions upon the material, or by a combination of one or more of these techniques. Elastic materials can usually be most efficiently ground by cutting and attrition. Brittle materials can usually be most efficiently ground by impact because the feed material shatters into many smooth faceted pieces along crystal boundaries and microfissures. Many materials such as tire rubber are elastic at ambient temperatures but become brittle when cooled below their glass transition temperature.

For rubber, cutting and attrition size reduction at ambient temperature requires several times the energy as does grinding embrittled rubber by impact. This grinding energy generates heat in the rubber crumb and can limit the capacity of the equipment. If the rubber is cooled below the glass transition temperature, impact grinding can be advantageously utilized to create crumb. Cooling the rubber to lower temperatures provides more capacity for grinding work to be performed on it without raising it above the glass transition temperature. This results in finer product.

Fine mesh crumb rubber finds application beyond filling of asphalt. Uses include bound rubber products, new tire manufacturing, turf applications, athletic and recreational flooring applications, molded/extruded products, automotive parts, construction products, animal bedding, and modifiers to plastics.

An embodiment of the invention where liquefied natural gas (LNG) provides cryogenic cooling capacity for cryogenic scrap tire recycling is now described with reference to FIG. 1. LNG 101 at −258° F. is pumped by pump 102 at the LNG facility into heat exchanger 103, sized to meet the cooling requirements of a cryogenic tire recycling facility 100. Natural gas and residual liquefied natural gas 104 leave the heat exchanger and return to the liquefied natural gas facility via return 105. The LNG flow rate is controlled via pressure $P_2$ of the natural gas and residual liquefied natural gas leaving the heat exchanger. Recyclable materials 106 such as scrap tires enter the heat exchanger and leave as cryogenic materials 107.

Several heat exchanger types and arrangements may be used, including, but not limited to: direct contact, indirect cooling through the use of an intermediate cooling medium, such as air, nitrogen, heat transfer fluid, or other refrigerant, and indirect cooling in a jacketed pipe, where the recyclable material is pumped through a central pipe while LNG is pumped into a cooling jacket, preferably in a counter-current fashion. In the heat exchanger, the LNG is partially-to-fully vaporized and is subsequently returned to the LNG facility.

Figure 2A:
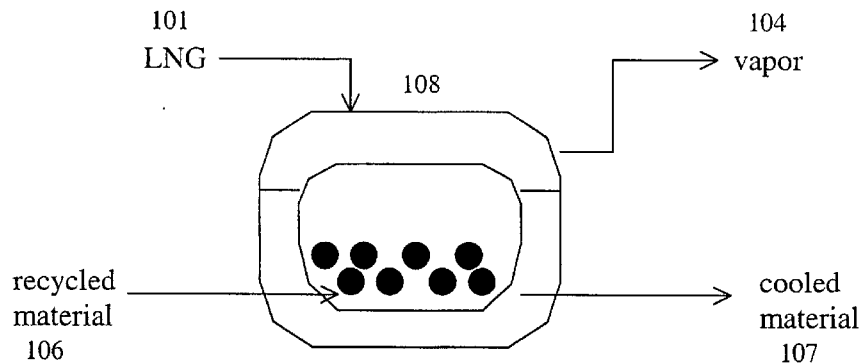
FIG. 2a is a schematic depiction of direct cooling of recyclable material by LNG and FIG. 2b is a schematic depiction of indirect cooling of recyclable material flowing within a pipe by LNG flowing within a jacket surrounding the pipe, both in accordance with embodiments of the invention.
Figure 2B:
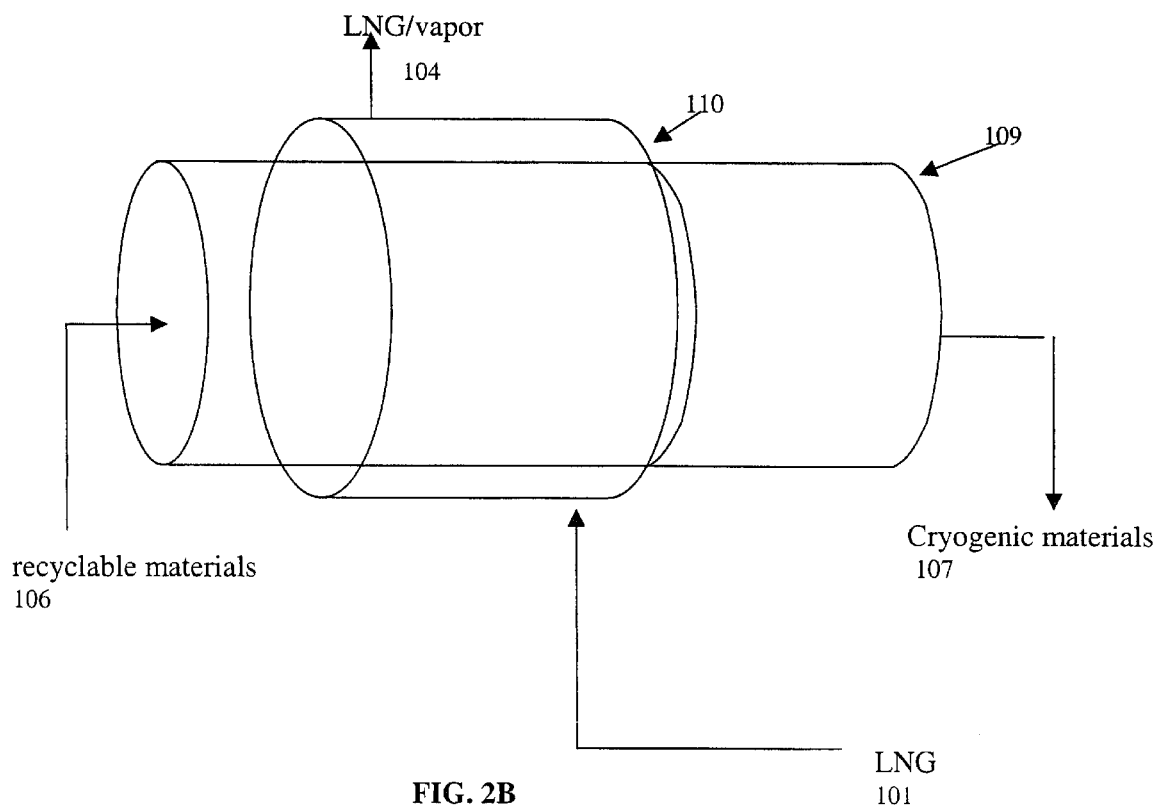
Figure 3:
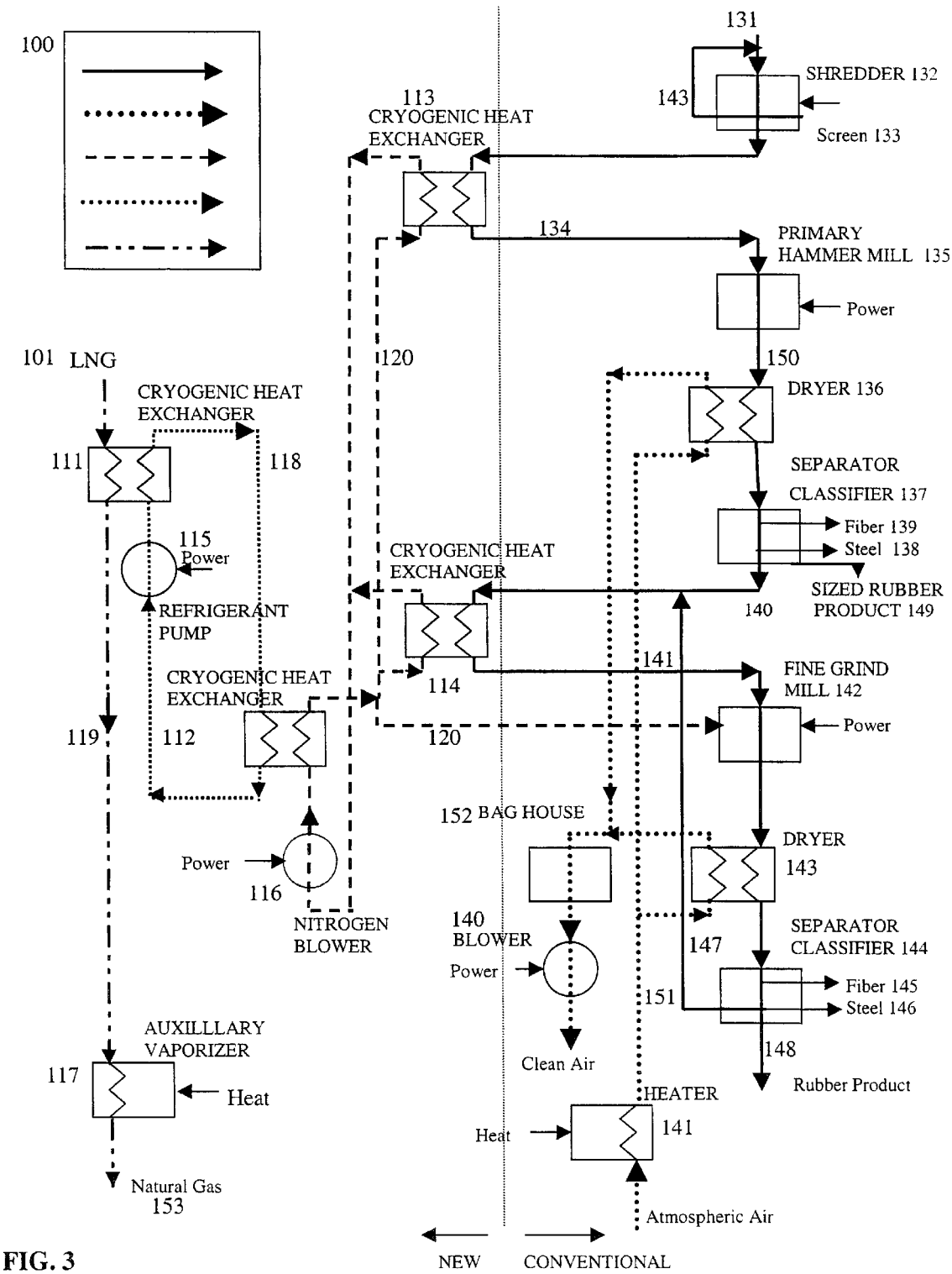
FIG. 3 is a process flow sheet for the recycling, in accordance with embodiments of the current invention, of tire feedstock into rubber crumb where the tire feedstock is cooled by gaseous nitrogen which had been previously cooled by a refrigerant which had been first cooled by LNG.

During vaporization, heat extracted from the recyclable material (either directly, indirectly, or via an intermediate cooling medium, such as air) cools the recyclable material to a temperature below its glass point (i.e. <−58° F. for styrene butadiene rubber (SBR) and −95° F. for natural rubber). SBR and natural rubber are the major components in tires although up to 6 or more rubber compounds are typically used in tires. At this temperature, the recyclable material can be ground into fine particles, greatly reducing grinding energy costs, as well as capital and maintenance costs. A complete discussion of cryogenic grinding of rubber may be found in Kohler, et al., "Enhancements in Cryogenic Fine Grinding", Rubber & Plastics News, Jun. 1, 1998, pages12–13, which is appended hereto and which is incorporated by reference. Examples of specific heat exchanger arrangements are shown in FIG. 2. FIG. 2a shows direct cooling of recyclable material 106 by liquefied natural gas (LNG) 101 in direct contact heat exchanger 108. The liquefied natural gas is converted into natural gas vapor 104. Recyclable material 106 enters the heat exchanger and leaves as cooled material 107. FIG. 2b shows indirect cooling of recyclable material 106 to cryogenic materials 107 during passage through central pipe 109 surrounded by jacket 110. Liquefied natural gas 101 enters the jacket and a combination of natural gas and residual liquefied natural gas 104 leaves. FIG. 3 shows cooling following two intermediate cooling stages.

In a process of recycling tires now described with reference to FIG. 3, incoming tire feedstock 131, in accordance with embodiments of the invention, is continuously fed into a primary shredder 132 where it is reduced to a nominal 1" to 2" size. The size is controlled by a screen 133 in the discharge of the shredder that separates the oversized pieces 143 and returns them to the shredder.

The tire pieces (not shown) are fed to cryogenic heat exchanger 113 where they are cooled with nitrogen gas 120 blown through the cryogenic heat exchanger by nitrogen blower 116 to below the glass transition temperature of rubber. Frozen, embrittled rubber 134 is then fed to primary hammer mill 135 where it is ground by impact of the hammers. The high intensity energy used for the grinding step causes rubber to be liberated from the steel and fiber components of the tire. The ground product 150 first passes through dryer 136 before entering separator classifier 137 where, through processes known in the art that may utilize magnets, screens, and aspiration, rubber is isolated. Drying is accomplished by atmospheric air 151 heated in heater 141, cleaned by bag house 152, and drawn through the dryers 136 and 143 by blower 140. Most of the steel 138 is separated and collected in a condition suitable for recycling. The fiber 139, with some residual steel and rubber, is disposed of as a waste material.

The energy expended in the grinding step normally raises the temperature of the rubber back to ambient temperature or higher. Because moisture causes fiber to foul the screen openings in the classifier separator, it is important to remove any residual moisture introduced with the feed material as well as any moisture that may have condensed on cold material that was exposed to moist air. After the drying step, the classifier removes fiber and steel and separates rubber crumb meeting desired product specifications 149 from rubber that is oversized 140.

The oversized rubber crumb 140 from the separator classifier is again cooled below its glass transition temperature by cold nitrogen gas 120 in cryogenic heat exchanger 114. The embrittled rubber 141, along with cold nitrogen gas for supplemental refrigeration 120, is fed to a secondary fine grind mill 142 that is operated at higher energy intensity and lower temperature than the primary hammer mill. Following passage through dryer 143, another separator classifier 144 removes more the trace steel 146 and fiber 145 contaminants from the rubber and size classifies the rubber by screens into rubber crumb product 148 and oversize rubber crumb 147. The oversize crumb is returned to the cryogenic heat exchanger 114 preceding the fine grind mill 142 for further cooling and processing.

The final product consists of pieces of metal wires, fiber, and finely ground rubber crumb. Product quality depends upon properties of the recycled material such as particle size and contaminants such as metal, fiber, dirt, and stone dust. These properties, in turn, depend upon the degree of cooling achieved. By cooling rubber to a temperature well below its glass transition temperature, the process may advantageously produce rubber crumb with the cleanliness and particle size distribution commanding a market price premium.

To reduce risk of fire, in accordance with a preferred embodiment of the invention, LNG 101 is isolated by using a suitable heat transfer fluid to transport refrigeration through a closed loop system into the plant. At the cryogenic tire facility 100, refrigerant 118 is used to cool gaseous nitrogen 120 in cryogenic heat exchanger 112. Through this process, the refrigerant is warmed and is then pumped back to the LNG cryogenic heat exchanger 11 by refrigerant pump 115. A portion of the LNG stream is vaporized through the process of transferring the heat from the refrigerant 118 to the LNG. Auxiliary vaporizer 117 completes the vaporization of the combined natural gas and liquefied natural stream 119 leaving the cryogenic heat exchanger. The resulting natural gas 153 is introduced into the natural gas system of the LNG facility.

Nitrogen is one preferred heat transfer intermediary to be in direct contact with the rubber and to purge the mills. High transit temperatures and sparks created by the steel in the mills during grinding and conveying can ignite the fiber and fine rubber crumb. Maintaining an atmosphere in the equipment that does not have enough oxygen to support combustion mitigates this risk. To reduce nitrogen costs, the nitrogen is recirculated following cleaning. There is makeup only for the nitrogen necessary to maintain the required low oxygen atmosphere.

Having thus described various illustrative embodiments of the present invention, some of its advantages and optional features, it will be apparent that such embodiments are presented by way of example only and are not by way of limitation. Those skilled in the art could readily devise alternations and improvements on these embodiments, as well as additional embodiments, without departing from the spirit and scope of the invention. All such modifications are within the scope of the invention as claimed.

What is claimed is:

1. A method of converting a material into crumb and for vaporizing liquefied natural gas, the method comprising:
   a. shredding the material;
   b. transferring heat from the shredded material to the liquefied natural gas so as to cool the shredded material and to vaporize the natural gas;
   c. crushing the cooled, shredded material;
   d. separating the crushed, shredded material into components including crumb; and
   e. collecting the vaporized natural gas for distribution to customers.

2. A method according to claim 1, further comprising:
   a. transferring heat from the crumb to the liquefied natural gas so as to cool the crumb;
   b. grinding the cooled crumb into ground product; and
   c. sorting the ground product into constituents, the constituents including fiber, steel, rubber crumb, and oversized rubber crumb.

3. A method according to claim 2, further comprising:
   a. transferring heat from a first refrigerant to the liquefied natural gas;
   b. transferring heat from a second refrigerant to the first refrigerant; and
   c. transferring heat from the crumb to the second refrigerant.

4. A method according to claim 3, wherein the second refrigerant is nitrogen.

5. A method according to claim 2, wherein grinding the cooled crumb includes grinding with a grinding mill.

6. A method according to claim 1, further comprising repeating steps a through c.

7. A method according to claim 1, further comprising:
   a. transferring heat from a first refrigerant to the liquefied natural gas;
   b. transferring heat from a second refrigerant to the first refrigerant; and
   c. transferring heat from the shredded tires to the second refrigerant.

8. A method according to claim 7, wherein the second refrigerant is nitrogen.

9. A method according to claim 1, wherein crushing the cooled, shredded material includes crushing with a hammer mill.

10. A system for grinding an elastomeric material with liquefied natural gas, the system comprising:
    a. a supply of liquefied natural gas;
    b. a heat exchanger for transferring heat from the material to the liquefied natural gas for creating cryogenically glassified material;
    c. a mill for grinding the cryogenically glassified material into ground material;
    d. a transporter for removing ground material; and
    e. a distribution network for providing vaporized natural gas to customers.

11. A system according to claim 10 wherein the heat exchanger comprises a container to which liquefied natural gas is added and from which natural gas is removed and to which material is added and from which cooled material is removed.

12. A system according to claim 10, wherein the heat exchanger comprises:
    a. a pipe into which the material enters at one end and from which cooled material leaves at the other end; and
    b. a jacket surrounding the pipe having an input into which liquefied natural gas enters and an output from which a combination of liquefied natural gas and natural gas is extracted.

\* \* \* \* \*